June 4, 1963   P. D. WURZBURGER   3,092,405
PIPE COUPLING
Filed Feb. 11, 1959   4 Sheets-Sheet 1

INVENTOR.
Paul D. Wurzburger

June 4, 1963 P. D. WURZBURGER 3,092,405
PIPE COUPLING
Filed Feb. 11, 1959 4 Sheets-Sheet 2

INVENTOR.
Paul D. Wurzburger
BY

June 4, 1963  P. D. WURZBURGER  3,092,405
PIPE COUPLING
Filed Feb. 11, 1959  4 Sheets-Sheet 4

INVENTOR.
Paul D. Wurzburger
BY Bonworth, Semiour
Harrison & Knowles

United States Patent Office 3,092,405
Patented June 4, 1963

3,092,405
PIPE COUPLING
Paul D. Wurzburger, Wickliffe, Ohio, assignor to The Weatherhead Company, Cleveland, Ohio, a corporation of Ohio
Filed Feb. 11, 1959, Ser. No. 792,507
5 Claims. (Cl. 285—341)

This invention relates to coupling fluid conductors and more particularly to improvements in and upon the generic type of pipe and tube coupling in which the gripping and sealing of the tube in the coupling is accompanied by cutting an annular groove in and turning up an annular ridge on the exterior of the coupled tube or pipe. Illustrative forms of such couplings appear in the U.S. Kreidel Patent No. 2,171,217 and in my prior patents Nos. 2,693,374; 2,693,376 and 2,823,935. For convenient designation these prior couplings will be called, the annular-cut type, and tube couplings and pipe coupling will ordinarily be referred to collectively as, tube couplings.

The importance and advantages of the Kreidel and my prior annular-cut type couplings are well known. My present invention solves problems which have in part persisted with the prior couplings and have in part arisen with progress and changes in the art of coupling and in the related arts. For example, the need for and use of stainless steel tubing has increased to meet the more exacting demands of resistance to corrosion, acid attack and the like, and of conducting fluids which are hard to confine at very high temperatures and pressures and under difficult conditions of vibration and stress. Modern stainless steel tubing often has its exterior surface very hard and very resistant to being cut by an annular-cut type of coupling. At an opposite extreme, light soft walled tubing has been promoted for its peculiarly advantageous uses. Here the annular-cut type of coupling may tend to constrict the tube undesirably incident to cutting the same to obtain a desirable grip thereupon.

Thus, the broad problem of gaining a sufficient cutting grip upon and engagement with different and changing kinds of pipes and tubes has persisted in its inherent aspects and has grown to more serious magnitudes in other aspects. Spring-back of the sleeve relative to the tube permitting relative rotation therebetween between coupling operation has always heretofore been a problem. In sum, the problems of coupling tubes and pipes more efficiently, repetitively more easily, more certainly and with more facile cutting penetration has persisted, has become aggrevated in many areas, and has awaited my present invention for their solutions.

It is, therefore, an object of my invention to solve the problems above described; more particularly, to provide a coupling preserving the advantages of the annular-cut type and also enhancing the facility of penetrating the exterior of the tube or pipe and diminishing especially the initial working effort required in the coupling operation. It is a concomitant object to cut, grip, seal and couple tubes and pipes without exerting deleteriously high radial constricting forces which tend to nick the tubes and pipes harmfully.

In the prior practice of tube coupling, including the use of at least certain forms of the annular-cut type, the tube engaging coupling sleeve or ring has often gains or "springs-back" to a freedom to move circumferentially with respect to the tube when, after a first complete coupling the tube and coupling are disconnected. This permits the ring or sleeve to fail to reseat on the tube in the same relation it first had to the tube, when coupled a second time, tending to permit leaks without unusual reseating effort in the second or subsequent recoupling operations. Therefore, another object of my invention is to provide that the coupling sleeve or ring and the tube in my improved coupling shall beneficently preserve inviolate their original and desired seated and substantially integrated mechanically strong and fluid-tight relationship throughout all coupling and recoupling operations that follow a first proper and correct one.

Another object of my invention is to provide a coupling in which the tube or pipe cutting sleeve, ring or element is constrained against rotation relative to the tube or pipe to be coupled while the coupling work is being done by rotation of a coupling member relative thereto.

It is also among the objects of my invention to improve upon prior practice by providing a cutting, gripping and sealing coupling with torque characteristics which require (1) a new low initial torque to begin the cutting and gripping work of the coupling upon the tube, and then, progressively (2) an increased torque with a noticeable "feel" of finality or "bottoming" to accomplish the desired and perfected mechanical grip and fluid-tight seal between the coupling and the tube, and (3) an extraordinarily and noticeable high torque to discourage further, i.e., useless and/or deleterious working of the coupling upon the tube. It is thus among my objects to provide a torque characteristic which will invite and facilitate making a complete and proper coupling, then clearly signal the completion thereof and then promptly discourage, and make it difficult to exert, deleteriously high torque on the coupling parts or work the same or the coupled tube or pipe injuriously.

A further object of my invention is to increase and improve the flexibility and constrictability of the cutting part of the tube engaging ring, sleeve or element of the coupling, and to preserve this object while also increasing the tube penetrating and plowing quality and effect of the cutting part of the said ring, sleeve or element.

Another object of my invention is to provide greater advantage for a given amount of tube cutting, metal working or penetration between the coupling and the tube than has been obtained or practicably obtainable with the annular-cut type of coupling.

Another object is to provide a coupling having a cutting engagement between the coupling and the coupled tube which has at least all the resistance against blow-out pressure and leakage of the most efficient annular-cut type of coupling, but in which the tendency to crack, rupture or impair the tube under the influence of vibration or alternating flexure is appreciably and advantageously reduced, if not substantially eliminated. A more specific object is to initiate the cutting and gripping action between a coupling and the tube to be coupled at a plurality of annularly arranged, circumferentially spaced points or places as distinguished from the continuity of points employed in the continuous circular edge of the annular-cut type of coupling. Collaterally it is among my objects to provide that the cutting grip between the coupling and the tube or pipe not only be initiated at a plurality of circumferentially spaced points or places, but also that the cutting begin as if done by a gang of circumferentially spaced plows or gouges so shaped and spaced with respect to each other as to facilitate initial penetrations into the hard skin of the surface of the tube and the desired subsequent penetration and plowing until the furrows of adjacent plows tend to merge and the desired grip, seal and bottoming is achieved.

A specific object is to provide a coupling with a serrated cutting edge as distinguished from the annular circular edge of prior practice, and, inter alia, to avoid the presence or harmful presence of burrs and other imperfections in circular cutting edges which tend to inhere in the annular-cut type coupling.

Another object in conjunction with the provision of a serrated edge in my coupling is to gain the advantage of work hardening the cutting points in the course of the making thereof.

Another object is to provide a tube coupling of the genus in which the tube or pipe is cut and penetrated in and by the coupling, but in which the initial cutting and/or penetration by the coupling or by one of the coupling elements will not make a fluid tight seal, but, on the contrary, the making of a fluid tight seal will be inherently deferred until after substantially all of the desired cutting and metal working of the tube by the coupling, and the entire, or substantially the entire, mechanical grip between the tube and coupling, has first been substantially completed. That is to say, it is among my objects to provide in a coupling of the tube cutting or plowing type that the metal working parts will have been caused to "bottom" in substantially full mechanical engagement before a fluid tight joint has been effected so that a leaking joint will betray the insufficiency of the mechanical connection, and the sufficiency of the mechanical connection will require on the one hand, and can be assured on the other hand, by working the coupling and the tube or pipe to be coupled therein to the point of eliminating leakage.

Another object is to provide tooth forms and profiles for serrated cutting edges for my invention to meet specifically and particularly the most difficult and extreme conditions to be faced in the art of coupling as presently understood. More particularly it is within this object of my invention to provide specific tooth forms and profiles preserving the ease of penetration and others of the objects stated above whilst, however, preserving the coupling against failure under conditions of extremely high pressure where super-plowing action may be deleteriously induced tending to permit failure by blow-out of the tube from the coupling or leakage incident to a limited blow-out movement of the tube relative to the coupling.

These and other objects and advantages will appear from the following description of illustrative and preferred forms of my invention; reference being had to the accompanying drawings in which.

Figure 13:
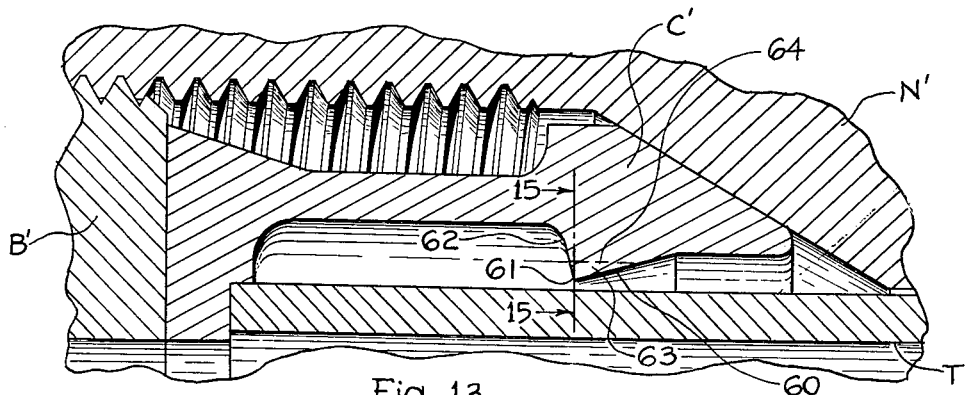
FIGURE 13 is a view taken similarly to FIGURES 1 and 2 showing an embodiment of my present invention in the form and environment of another of my prior patents; the parts being assembled and in the condition just prior to working as in FIGURE 1.
Figure 14:
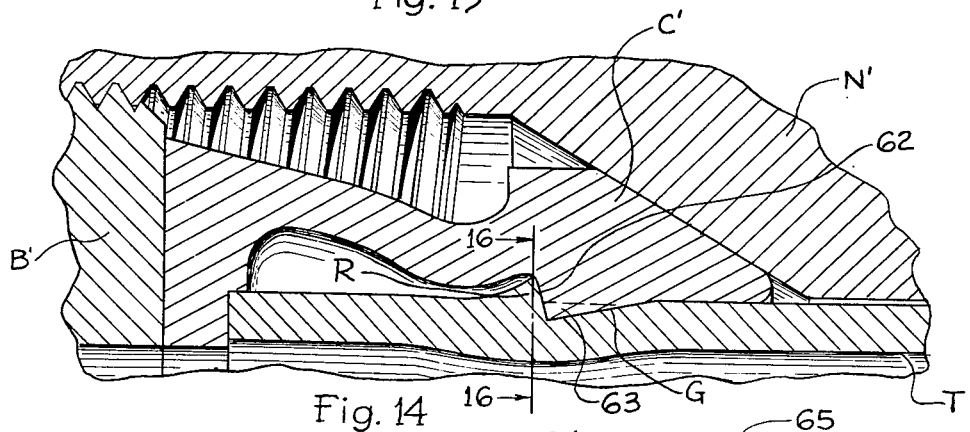
FIGURE 14 is a view corresponding to FIGURE 13 in which the parts are shown after having been worked to completion of the coupled joint as in FIGURES 2 and 4.
Figure 16:
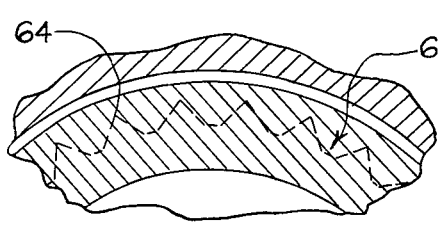
Figure 15:
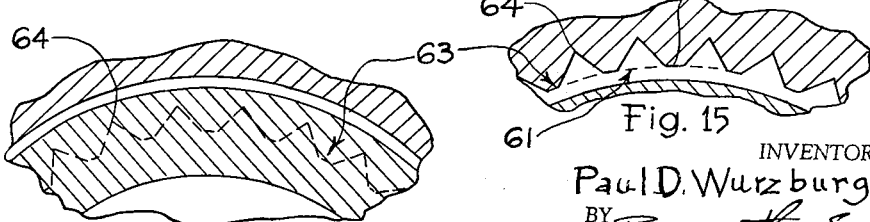

FIGURES 15 and 16 are respectively transverse sections taken in the planes of the lines 15—15 and 16—16 of FIGURES 13 and 14 respectively.

Figure 17:
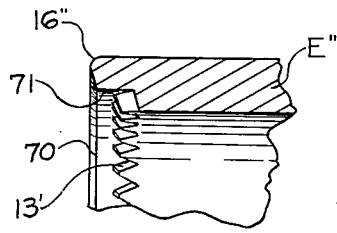

FIGURE 17 is a fragmentary view of a coupling element similar to the elements shown in FIGUREE 3 and 11 with, however, a specifically different form of cutting edge and cutting means combined.

Figure 18:
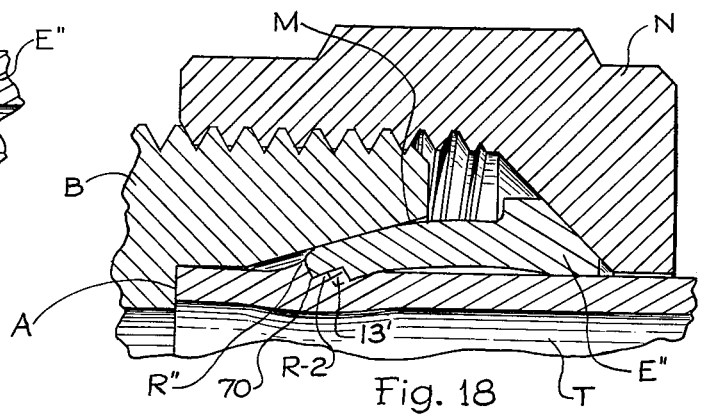

FIGURE 18 suggests the worked relationship of the coupling element of FIGURE 17 in coaction with a body and tube coupled thereto and joined therewith.

Figure 19:
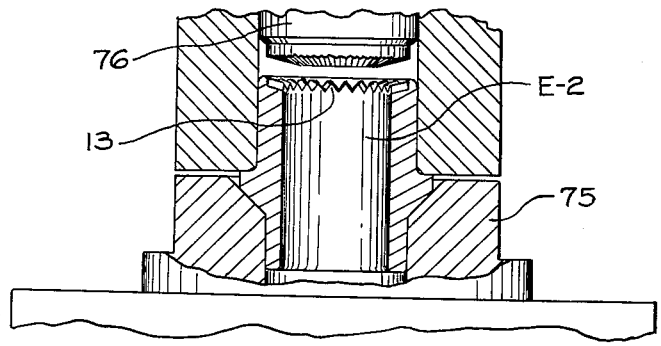

FIGURE 19 is illustrative of one way of forming a serrated edge embodying my invention in a coupling element.

Figure 20:
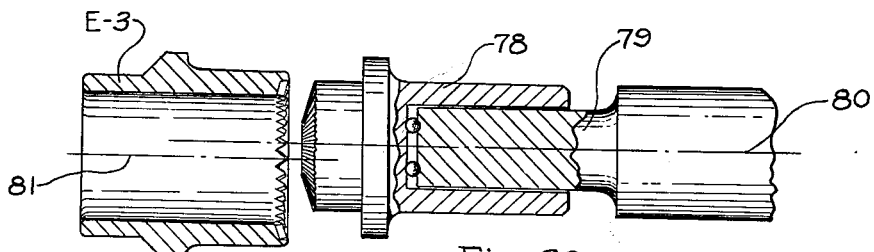

FIGURE 20 suggests and illustrates another way of embodying my invention in a coupling element.

Figure 21:
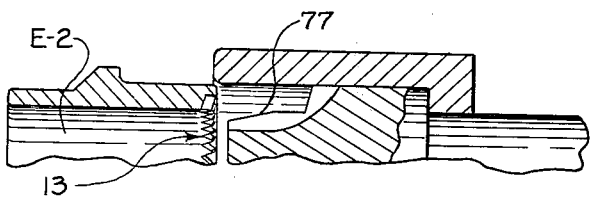

FIGURE 21 illustrates and suggests a desirable second step of reaming out the inner ends of the cutting means after the same have been formed as in FIGURES 19 and 20.

Referring now to one preferred form of my invention shown in FIGURES 1 to 8, inclusive, there is shown an externally threaded body B within and to the rearward (rightward as viewed) portion and end of which the tube T is, and/or is to be, coupled and joined by the forcible forward motion of the internally threaded nut N relative to the body B. The coupling element E is worked between the camming shoulder 6 of the nut and the internally flared mouth M of the body into mechanically integrating, gripping and fluid-tight sealing relation with the tube. The same working of the element E simultaneously and reactively brings about a fluid-tight seal between the element E and the flared mouth M of the body, FIG. 2, and a secure mechanical engagement between and functional integration of the coupling element, body, nut and tube, FIGS. 2 and 4.

The body B has a bore 1 co-extensive with the bore of the tube T, and has an annular abutment A near the forward end of the mouth M against which the extreme forward end of the tube bears forcibly and is restrained from forward motion when forward axial pressure incident to the coupling operation urges the tube forwardly so that reaction is developed between the tube and the tube cutting means 13, its serrated parts, points and edges, to effect the work of cutting, plowing and gripping the tube. The nut N has a bore 5 coaxial with the bore of the body and coaxial with and encompassing the tube. Near the forward end of the bore 5 the nut has an inwardly and forwardly facing inclined, preferably substantially conical, female seat, i.e. camming shoulder 6, mentioned above, which is engageable with the complementary, outwardly and rearwardly facing male shoulder 7 on the outer rearward end of the coupling element E.

The nut N and body B are otherwise shown in their conventional forms and I shall use the terms, nut and body, to comprehend equivalent forms and instrumentalities such as a flanged body and a flange ring for doing the same or substantially the same work in the same way and getting the same or substantially the same coaction and results with the element E and tube T.

Figures 2, 3:
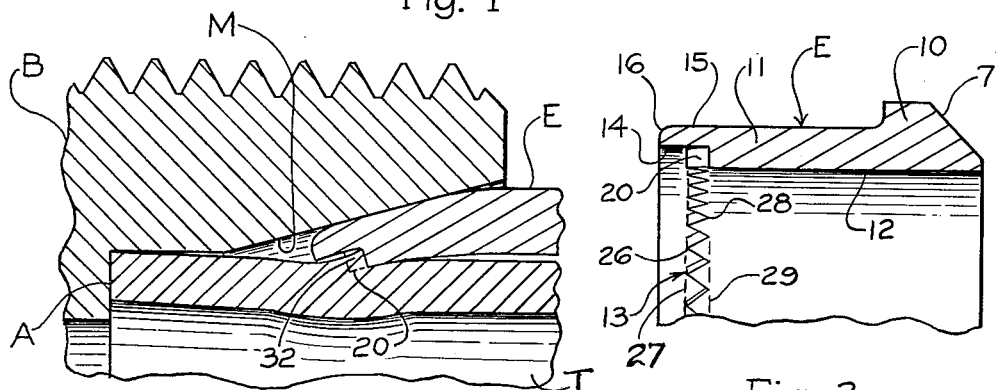
FIGURE 2 is an enlarged, detailed view in the longitudinal section of FIGURE 1 showing, however, only the mouth of the body and the forward end portions of the tube and coupling element in the coupled condition after the parts have been worked thereto.
FIGURE 3 is a fragmentary, longitudinal, sectional view of the coupling element in its preworked condition, absent the tube to be coupled and the nut and body of FIGURE 1.
Figure 4:
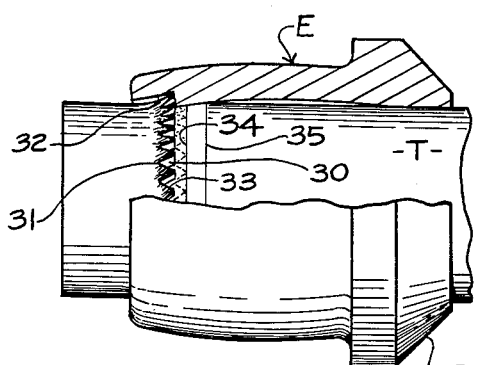
FIGURE 4 is a view similar to FIGURE 1 with, however, the parts of the combination of body, nut, element and tube being shown in their worked condition after the coupling has been completed; the coupled tube being shown in full etxerior view in one quadrant as the same would appear interiorly of the tube gripping element in the worked and joined condition.

The sleeve or coupling element E, FIG. 3, conventionally has had, and here may have, at its rearward end a thickened annular portion 10 with the outer and rearward shoulder 7, mentioned above, and has an elongated central tubular portion 11 of wall thickness not unlike the wall thickness of the tube T and of sufficient axial strength to transmit the desired cutting and plowing forces from the nut to the cutting means 13; the portion 11 being of less external diameter than the rearward portion 10 and both having the inner circular cylinder bore 12; the forward end of the bore 12 short of the extreme forward end 15 of the element, comprising the place and disposition of the tube cutting or plowing teeth, edges, serrations, points or means 13 which cut, penetrate, bite and engage the tube T, FIGS. 2 and 4. Following preferably here the teachings of Kreidel, pro tanto, it is practicable that the shoulder 7 of the element E be pitched a little less steeply than the shoulder 6 of the nut N with which it coacts, so that the central portion 11 will tend to be bowed outwardly slightly when the element E is forcibly urged into the mouth M, tending, with the coaction of the mouth, to bow up and out the middle of the portion 11 rearwardly adjacent the means 13 whereby to facilitate smooth sliding entry into the mouth and help provide a relief angle for such of, or such parts of, the means 13 as will cut and bite the tube and tend to provide stressed resilient tension in the grip upon the tube to maintain a tight joint under widely varying conditions of use. Lacking, however, some or all the difference between the pitch of the shoulders 6 and 7 a tendency to provide a relief angle arises from the work of the mouth M on the forward lip 15, or forward end of the coupling element. The spaced cutting points 26, as will appear more fully below, tend to begin their cutting work with the first radial motion thereof and/or the radial motion combined with tipping of the cutting means by the mouth M.

The forward end 15 of the sleeve E is counterbored out as at 14 to about the full radial depth of the means 13, and the outer forward corner of the sleeve is rounded as at 16 whereby to not scuff the mouth M but enter the same smoothly and serve as a bendable, guiding lip for and leader of the constriction of the means 13 into its cutting and plowing attack on the tube with both radial inward and axial forward motion similar to Kreidel's, but with better and different consequences and results.

Figure 5:
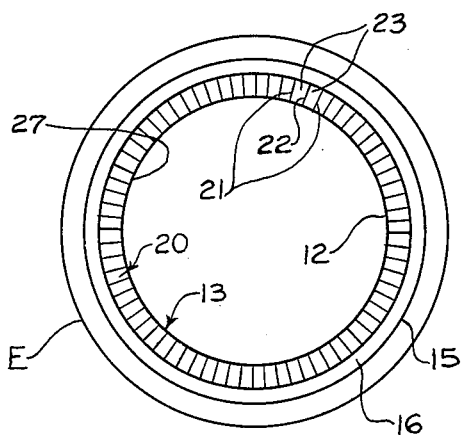
FIGURE 5 is a front end view of the coupling element shown as in FIGURE 3 apart from the other elements of the combination with which it coacts.

Unlike Kreidel my cutting means 13 in this form of my invention comprises a plurality of sharply pointed, sharply edged, forwardly facing, wedge shaped, tube-penetrating teeth 20, FIGS. 3, 5, 6 and 7, each having a forwardly aimed, top, radial edge 21, radial root lines 22, inclined, rearwardly diverging side faces 23 joining the top edges and root lines and lying normal to the bore 12, and each tooth having triangular inner faces 24 co-extensive with the bore and intersecting the faces 23 along sharp, approximately helical, inner edges 25; the edges 21 and 25 and the faces 23 and 24 all intersecting in the forward and radially inward, common, hard, sharp, cut-initiating, spaced points 26, all lying in the last forward circle 27 of the cylinder of the bore 12, designated only in FIG. 5. This circle 27 will be called the cutting or top point circle. Where the root lines 22 intersect the cylinder of the bore 12 as at the points 28, FIGS. 3, 6 and 7, there will be described another circle 29, suggested only in part for clarity in FIG. 3, embracing the points 28, which can conveniently be called the root or root point circle.

Figure 1:
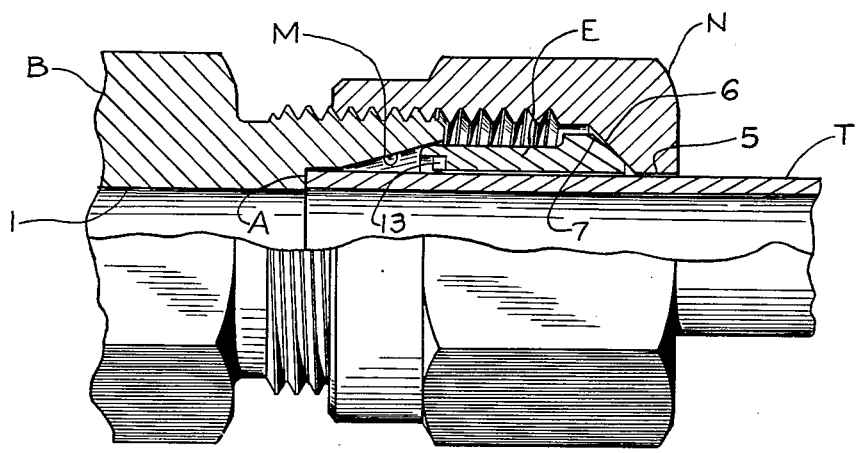
FIGURE 1 is a side elevaiton particularly in longitudinal section of the combination of body, nut, coupling element and tube in assembled relation prior to working the parts to fulfill the coupling of the tube to the body.

In this form of my invention when the nut N has begun the working or preliminary working of the element E and begun to force the lip 15 of the element E into the mouth M of the body and has, or has brought, substantial congruence between the camming shoulder 6 of the nut N and bearing shoulder 7 of the element E, all as approximately shown in FIG. 1, then the forward portion of the element will begin to be bent and constricted inwardly bringing the points 26 of the teeth 20 into first cutting and penetrating contact with the exterior of the tube T. In this condition and circumstance all the inward radial forces and all the forward axial forces that can be brought to bear on the means 13 for cutting and plowing the exterior of the tube are thus first focused at and concentrated on the several spaced cutting points 26. It follows that since these points of contact are in the first increments of motion almost literally geometric points, that the unit force at each point will tend to be very great, whereby to admit and greatly facilitate the first penetration of the wall of the tube with less cutting effort and less wrench torque than attends the cutting according to my prior practice, or that of Kreidel, with an entire continuous circular edge first engaging the tube.

As the element E is worked into the mouth M of the body and the lip 15 and the means 13 bent longitudinally and constricted radially and circumferentially as for example in the progress from the beginning of working suggested in FIGURE 1 to substantially the completion of working as suggested in FIGURES 2 and 4, the fact that the cutting points 26 are widely spaced from each other greatly facilitates the constriction of the whole means 13, particularly at and near the cutting point circle 27 in relation to the root point circle 29, so that, again a higher proportion of the effort of working the element in the first instance is devoted to the penetration of the tube by the points 26 and the adjacent foremost and innermost parts of the teeth 20.

The nature of the means 13 also permits an easier inward longitudinal bending thereof while the same is being constricted circumferentially and radially, so that again, and for this additional reason, more of the working effort given to and/or delivered through the nut N is given to the desired cutting and gripping of the tube and less to working the element E in preparation for and incident to the desired cutting work.

As the penetration, cutting and plowing of the tube by the points 26 proceed, as from the state of FIGURE 1 toward the state of FIGURES 2 and 4, the teeth bite more deeply into the tube as the element E enters the mouth more deeply, and stock plowed up from the wall of the tube tends to fill up the radially outward spaces between the faces 23 of the teeth 20 and the surface 14 of the counterbore adjacent thereto, see FIGURE 2, tending on the one hand, to dig a trench-like groove 30, FIGURE 4, with a forwardly and inwardly sloping bottom, FIGURE 2, of maximum depth at its forward zig-zag parapet wall 31, and, on the other hand, turn up a ridge 32, FIGURES 2 and 4, having a sloping forward surface and tending to fill the rearward end of the counterbore 14 along with the radially outward parts of the teeth 20 and having a zig-zag rearward face co-extensive with the wall 31.

When the points 26 are caused by the action and reaction between the nut, element, tube and body to dig into the tube, the resolution of their radially inward and axially forward paths will be largely influenced by the pitch of the conical camming surface of the mouth M as it induces longitudinally inward bending of the forward end of the element E including the teeth 20 as well as radial constriction of the latter. In the preferred and illustrative embodiment of my invention the pitch of the conical surface of the mouth M may lie between about 10 to 20 degrees. The longitudinal curving of the teeth 20 may well and advantageously cause the points 26 to advance into the tube in paths of inward curvature departing from true conical form and curving the edges 25 slightly, all tending to admit of desirable low wrench torque during the initial increments of tube penetration and facilitating the beginning of the plowing into the surface of hard and difficult-to-cut tubes. On the other hand, the curving paths of the points 26 tend to leave a somewhat roughened and/or serrated surface 33 in the forward part of the groove 30 adjacent to and behind the wall 31 when the working of the parts and the gripping of the tube has been completed; the edges 25 tending to be curved a little as they move inwardly and forwardly and to cut more deeply near the top points 26 than near the root points 28 of the teeth. The rearward surface of the groove 30 gains smoothness and a smooth, substantially conical bearing and sealing contact with the bore 12 of the element E upon the substantially conical surface that has been forcibly worked, cut and wiped ahead of and by the constricted bore behind the teeth, as from about and between the lines 34 and 35, FIGURE 4. The rearward circle 35 represents about the rearward end of the groove 30 and about the rearmost line of forcible tight contact between the constricted inturned forward end of the bore 12 of the element E and the tube T. The forward circle 34 suggests the forward boundary of the limited area of smooth, circular, tight, substantially conical contact between the element and the tube behind the serrated surface 33.

It is an advantageous feature of my invention that the ridge 32 tends to fill the teeth 20 adjacent to and/or along with the constricted counterbore 14 in front of the teeth, and progressively tends to inhibit further cutting, penetration and plowing of the tube by the teeth at about the same time the root point circle of the teeth has been worked into the groove 30 from about the line 35 to about the line 34 to make a desirable, smooth, continuous, fluid-tight, vibration-resistant contact and engagement therewith. Conversely, when the tooth points 26 first dig into the tube, fluid can flow between the spaced diggings of the points until at least the roots of the teeth tend to make fluid-tight contact with the parapet wall 31 and ridge 32 and/or until the inner tooth cutting edges 25 have achieved full cutting engagement with the tube from the top points 26 to the root points 28, and contributed throughout all their aggregate, zig-zag lengths to cutting the tube and turning up their respective parts of the whole of the ridge 32.

The culmination of these phenomena may be called "bottoming" in respect to fulfilling the coupling operation. That is to say, bottoming represents substantially the summation of all, or the most necessary and desirable of the conditions that (1) the points 26 have penetrated the tube deeply and dug and plowed forwardly significantly and gained a desirably strong, permanent and fixed mechanical grip on the tube, (2) the whole of the zig-zag cutting edge 25—25—25 etc. is fully engaged with the tube and in fluid-tight engagement therewith at the bottom of the whole wall 31, (3) the root point circle has had appreciable forcible moving and squeezing contact with the groove 30, (4) the ridge 32 has been well turned up, tending to fill the roots of the teeth and the counterbore, (5) the bore of the element has smooth, forcible, fluid-tight engagement with the groove between about the lines 34 and 35, (6) the forward end of the element contacts the tube internally and has wide, smooth, fluid-tight contact with the mouth M externally, (7) the rearward annular portion 10 of the element E firmly engages the tube and is tightly embraced in the nut with the shoulders 6 and 7 in mutual tight contact; in sum, the desired mechanically strong and fluid-tight connection between tube, element, body and nut has just been entirely fulfilled but not overdone. At bottoming, leakage stops and wrench torque sharply increases, signaling to the operator that the coupling is complete and that additional torque applied to and turning the nut is both unnecessary and better not applied. As suggested above, one of the advantages of my invention is that fluid-tight sealing against significant fluid pressure is closely concomitant with the above bottoming, and, like the sharp increase in wrench torque, beneficently signals the benign fulfillment of the coupling operation.

It will also be appreciated that relatively little wrench torque is required to first prick and penetrate the wall of the tube by the points 26, and that thereafter progressively more power is required to dig and plow with increasing lengths of the inner cutting edges 25 and increasing lengths of the front cutting edges 21 and, finally with or at the root points 28. Similarly it will be appreciated that the wrench torque will tend to increase gradually while increasing parts of the edges 21 and 25 gain cutting engagement with the tube and the plowing, cutting and diging proceeds until the condition of "bottoming" is reached as above described with a sharp, desirable increase in wrench torque to signal the same after which deleteriously high torque would tend rather to overdo matters without corresponding gain or advantage in either gripping or sealing or adding to the efficiency or sufficiency of the coupling.

It will also be appreciated that after a coupling has been completed and the parts have been worked to approximately the condition of FIGURES 2 and 4 that the element E will have gained a substantially integrated nonrotatable relation with the tube T such that when the coupling is opened as by unscrewing the nut from the body and removing the tube with the attached coupling element E from the mouth of the body, that the element will retain its coupled relation with the tube so relatively immovably that for and upon all subsequent recouplings the teeth and all the cutting edges thereof will find the same points, lines and places of contact and engagement in the groove 30 and in the wall 31 and surface 33 in the same and substantially identical fluid-tight, mechanically integrated relationship.

Figure 8:
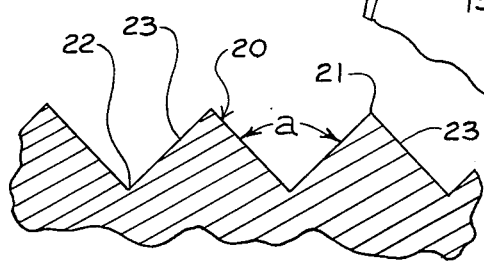
FIGURE 8 is an enlarged and expanded cross-sectional view showing a profile of the teeth of the serrated edges of the preceding figures.
Figure 9:
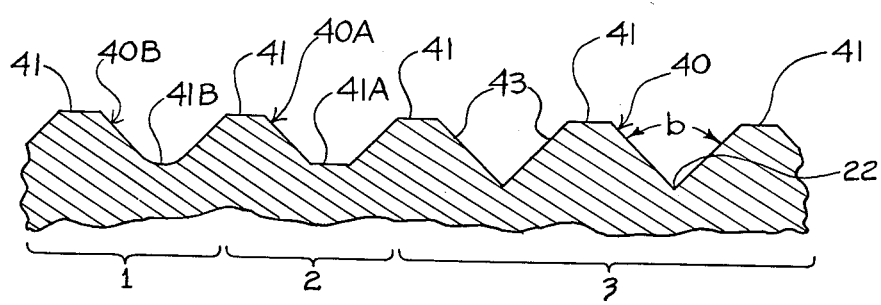
FIGURES 9 and 10 are composite views, each taken similarly to FIGURE 8 but showing a plurality of different tooth profiles useful in my invention.

In this first form of my invention hereinabove described, the profile of the teeth 20 is suggested in FIG. 8; the angle $a$ between the faces 23 being about 90° and the top lines 21 and the root lines 22 being substantially sharp as in V-thread forms. My present experience is that the ridge 32 tends to fill the roots of these teeth satisfactorialy at this angle and rather better than with this tooth form sharpened or narrowed to lesser angles. My present preference is that this tooth form be employed to its best relative advantage to couple small size tubes such as about ¼" O.D. or less. To couple larger tubes with maximum security against the most arduous demands of service, regard being had for the various materials thereof, I presently prefer other tooth forms and dispositions shown in other figures of the drawings and described below by way of additional exemplification and illustration of my invention. For economy of space, a plurality of different tooth profiles has been illustrated in both FIGURES 9 and 10 to which reference will be made respectively, thus:

In part 3 of FIGURE 9, that is, the right portion of the figure as viewed, the tooth profile comprises preferably an angle $b$ between the side faces 43 of the teeth 40 of no less, and preferably little more than 90°, and this profile comprises the flat tops 41 of the teeth which here retain the V-roots 22 of FIG. 8. In this form I have found it practicable that the flat tops 41 have transverse widths of about one-fourth to about one-third the whole pitch or width of the tooth such as .010" to .015" of flat in a tooth for a whole width of .040" for use with stainless steel tubing in sizes from about ½" to 1" O.D. For nonferrous tubes of the same sizes the proportion of flat to pitch may be higher; 40% to 50% flat being advantageous. For larger sizes the proportion of flat top to pitch is preferably increased; for example for 2" O.D. stanless tube, the flat may advantageously be half the pitch. For non-ferrous tubes of similar size, the proportion may be as great or a little greater. In these examples, the coupling element bearing the teeth may be made of C1113 low carbon and/or leaded, cyanide case hardened steel. Alternatively C–1010 cold drawn steel, machined and case hardened may be employed.

This flat topped tooth form or profile has fundamentally the same mode of operation, function and results as the form of FIG. 8 hereinabove described, and has additional advantages and an improved mode of operation, thus: Depending not inconsiderably upon the material of which the tube T is made, I discovered by tests that under conditions of extremely high pressure the tube T could be induced to move out or blow out of the coupling, having a sleeve or coupling element with teeth of the form of FIGS. 7 and 8, enough to admit leakage by virtue of the pointed teeth being induced to cut a little further and a little deeper into the tube rather than restrain the tube from all outward motion. In aggravated cases, the pointed teeth of FIG. 8 under certain extreme pressure conditions, with other than small tubes, may tend to plow long furrows through the ridge 32 all the way to the end of the tube and let the tube blow out of the coupling, other features of design being the same. Further tests showed that the flats 41 on the tops of the teeth 40, and with this principal change alone from the teeth 20, solved the problem of failure under extreme blow-out conditions with tubes that were very difficult to couple. This followed, as I believe, because the flattened tops of the teeth sufficiently diminished the propensity of the pointed tops of the teeth to plow more than was advantageous and desirable under extreme pressure conditions with the relatively larger tubes.

Figure 7:
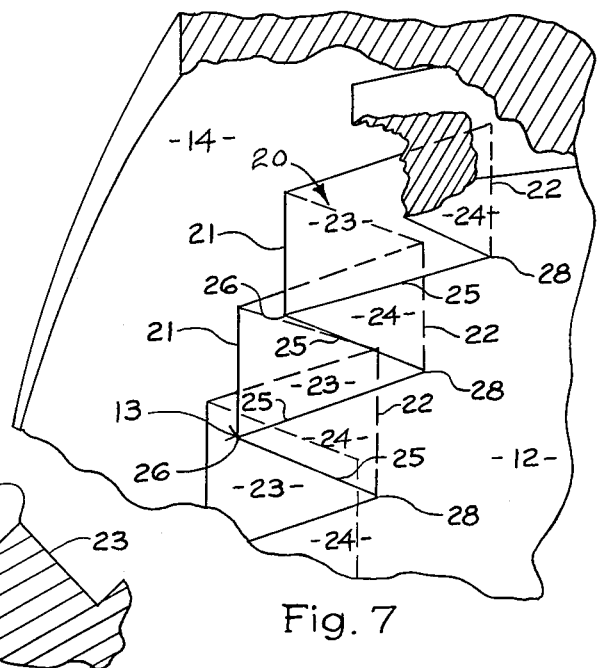
FIGURE 7 is a greatly enlarged portion of the interior forward part of the coupling element viewed from a direction similar to that of FIGURE 6 showing the details of the cutting tooth structure.
Figure 11:
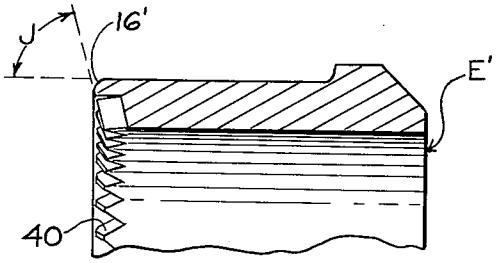
FIGURE 11 is similar to FIGURE 3 but shows a modified form of my invention.

With the profile of part 3 of FIGURE 9, it is also my further preference that the teeth 40 be formed as shown in FIGURE 11 with a rearward rake J of about 75° (for illustration but not limitation) from the axis to depart in this respect additionally from the forms first above discussed, FIGURES 3, 7 and 8 for example. In FIGURE 11, the coupling element E' may also differ from the element E, shown in similar view in FIGURE 3, by the elimination of the leading lip or forward end 15, but with the retention of the rounded outer forward corner 16' corresponding to the outer rounded corner 16 of the element E; the corner 16' being proximate the teeth 40 and overlying the same. The negative rake of the teeth 40 augments the effect of the flattened tops 41 and combines to tend to diminish additionally any deleterious super-plowing propensity of the teeth of whatever profile. Negative rake alone tends to preserve the coupling-tube combination from blow-out failure under conditions of extreme high pressure while retaining substantially and essentially all the main advantages of my invention hereinabove described.

In part 2 of FIGURE 9 the teeth 40A may have the flat tops 41 of the teeth 40 and be otherwise the same except that their roots may also be flattened as at 41A. In this form the anti-plowing action of the serrated teeth is modified somewhat more than in the form of the teeth 40 but not disadvantageously so; this form also preserving the major advantages of the preceding forms and having substantially the same mode of operation. Flattened roots 41A presently appear rather more difficult to form than flattened tops 41, and I presently believe that the proportion of top flatness to pitch is not enhanced in direct proportion by the mere addition of root flatness. In part 1 of FIGURE 9 the teeth 40B are shown to distinguish from the teeth 40 and 40A preferably only in the rounded roots 41B. Both the rounded roots 41B and the flattened roots 41A have the additional advantage of "filling" with the stock of the ridge 32 and permit where desired the use of an angle smaller than the angle b while creating a fluid sealing relation between the roots of the teeth and the first increments of the ridge turned up at the root during the cutting and plowing motion of the serrated edge.

Figure 6:
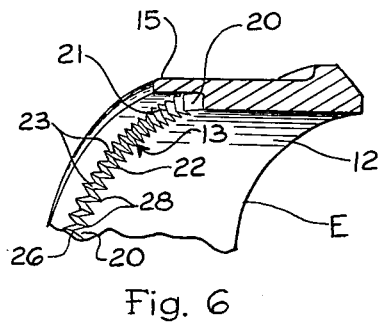
FIGURE 6 is a fragmentary perspective view of approximately a quadrant of the said tube engagement element.

It is within my teaching that any of the tooth profile forms of FIGURE 9 may be substituted for the forms of FIGURE 8 in the coupling sleeve of element E of FIGURES 6 and 7 especially for the purposes of meeting the above mentioned conditions of extreme pressure, tube size and material. Similarly it is within my teaching that the forms of parts 1 and 2 of FIGURE 9 may also be used with the rearwardly raked tooth construction of the sleeve or coupling element of E' of FIGURE 11. Similarly it is within my teaching that the specific tooth profile of FIGURE 8 may be employed in the raked tooth construction of FIGURE 11 with substantially all the advantages and usefulness described in respect to FIGURES 3, 6 and 7 with, however, the additional advantage of inhibiting the super-plowing action because of the rearward rake of the teeth.

Figure 10:
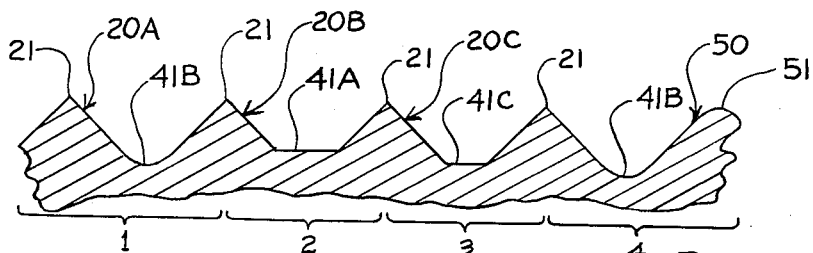

In the four parts of FIGURE 10 it is my intention to teach a departure from the tooth profile of FIGURE 8 somewhat oppositely of the ways of departure shown in FIGURE 9. The profiles of FIGURE 10 illustrate that the pointed tops 21 of FIGURE 8 may be retained but the disadvantage of super-plowing mentioned in respect to FIGURE 8 may also be reduced satisfactorily or eliminated by rounding or flattening the roots of the teeth. In part 1 of FIGURE 10 the rounded root 41B is provided between teeth 20A which otherwise correspond to the teeth 20 of FIGURE 8, preferably having the faces of the teeth at about right angles to each other but admitting greater or lesser angles without departing from the broad teachings of my invention.

In part 2 of FIGURE 10 the teeth 20B correspond to the teeth 20 but have the flat root form 41A substantially corresponding to that of part 2 of FIGURE 9. In part 3 of FIGURE 10 the teeth 20C may correspond to those of part 2 last above mentioned except that I suggest the root form 41C be rather narrower than 41A last above described. The narrower flat root 41C will, according to my present experience, tend to fill with the upturned ridge better than the pointed roots 22 and will tend to inhibit the super-plowing effects less fully than the wider flat root 41A. In part 4 of FIGURE 10 the profile of the tooth 50 takes sinuous form with rounded tops and root to suggest a further useful variant preserving substantially all the advantages of the other forms and compromising the advantages of most easy penetration and most anti-plowing. The degree of rounding the tops 51 and/or roots 41B of the teeth 50 in respect to pressure conditions, tube sizes and materials and the hardness or softness thereof will, as I presently prefer, follow relatively the teaching of illustration and example given with especial reference to part 3 of FIGURE 9. The proportionate length of flatness of the roots 41A and 41C to the pitch of the teeth may, according to my present experience and preference, follow the same teaching to meet substantially the same extreme high pressure conditions with tubes of different metals as that described specifically in respect to the flat tooth form of part 3 of FIGURE 9 above.

The tooth profiles of FIGURE 10 may be employed with strictly radial teeth as illustrated in FIGURE 7, for example, or with the teeth being raked more or less as shown in FIGURE 11, or for that matter, with the teeth given a positive advanced cutting angle oppositely of a rake, the latter within reasonable limits enhancing the plowing effect oppositely of the inhibition to the plowing effect which follows raking the teeth as hereinabove described.

Figure 12:
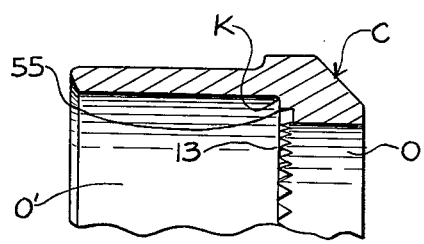
FIGURE 12 is a view taken similarly to FIGURES 3 and 11 but shows a form of my invention embodied in a coupling sleeve of one of my prior patents.

In FIGURE 12 there is illustrated the employment of my invention in the form of coupling element C which in turn is one of the forms of coupling element illustrated and described in my prior Patents Nos. 2,693,774 and 2,693,775. As is more fully explained in my prior patents the coupling element C has its cutting edge and/or cutting means 13 at the forward end of the bore O whereby the coaction of the nut and body of the coupling element the cutting means 13 is induced to plow into, cut and grip the tube to be coupled in substantially the same way and with substantially the same specific functions and results as the cutting means 13 has when it is embodied at the forward end of the bore of the coupling element E or E' hereinabove described. In FIGURE 12, I seek to illustrate the broad utility of the instant invention by its employment in the element C. My teaching is that the serrations in the cutting edge of the element C may comprise any of the tooth forms and profiles hereinabove illustrated and described with the same or substantially the same mode of operation, advantages or results as described with respect to substantially the same serrations, tooth forms and profiles and/or rakes or positive cutting angles hereinabove discussed with reference to the coupling elements E and E'.

It is convenient in this form and exemplification of my invention to illustrate and describe an additional aspect and consideration about the instant invention, namely, the radial depth of the serrations and/or teeth of the cutting means 13 of my invention. In the coupling element C as illustrated and described in my prior patents, the radial depth of the whole cutting edge, i.e. the difference between the radii of the rearward bore O and the forward bore O' was preferably meant to be no greater than the radial height of the ridge intended to be turned up from the exterior surface of the wall of the tube while making the desired mechanically and fluid-tight cutting engagement between the element C and the tube as the element C was worked between the nut and the body parts of the coupling. Taking this for the nominal radial depth of the forward face of the counterbore K or step between the bores O and O', I have illustrated in FIGURE 12 that the serrated means 13 may have a radial dimension of less than all, for example, only about half of the radial depth of the counterbore K so that the teeth comprising the serrations whatever their form, profile or rake will terminate radially outwardly at about the circle 55. In this form of my invention the serrated part of the cutting edge will have the mode of operation above described until the whole of the serrated cutting means 13 has dug into the wall of the tube to its whole depth behind a ridge corresponding to the ridge 32 above described. Thereafter, the continued plowing motion and constriction of the whole of the cutting part of the element C will bring the flat radial forward face of the counterfore K into forcible bearing contact with the ridge tending, probably in a somewhat different way, to inhibit the super-plowing of the pointed teeth when the same are employed in the means 13 to gain the maximum advantage of the serrated edge in the initiation of the cutting and plowing action.

In FIGURES 13 to 16 I have illustrated an embodiment of my present invention in a form of coupling specifically patented in my prior U.S. Patent No. 2,823,935. Here the coupling element C' is worked between the nut N' and the body B' to plow into, cut the groove G in and engage the tube T, and turn up the ridge R', cf. FIGS. 13 and 15 with FIGS. 14 and 16, as taught in my patent. Characteristic of this coupling and the coupling element C' is the tapered bore 60 expanding outwardly and rearwardly from the circle of the cutting edge 61 which lies at the intersection of the bore 60 with the radially disposed, preferably slightly rearwardly raked, forwardly facing shoulder 62 corresponding to the shoulder or counterbore K of the element C.

To gain the advantages of the instant invention in this form of coupling and coupling element and to take advantage of the facility of serrating the cutting edge adjacent a tapered bore, as by a simple broaching operation, I cause the teeth 63, see FIGURES 15 and 16, to lie axially of the coupling with their root lines 64 preferably parallel with the axis of the coupling element C'. The specific tooth profile chosen to illustrate this form of my invention may substantially correspond at the foremost end of the teeth in the plane of FIGURE 15 to the profile of part 3 of FIGURE 9 with "flat" tops 65 that are, however, literally co-extensive with the circle 61 of the intersection of the bore and the face 62. The teeth 63 as viewed in FIGURES 13 and 14 taper from front to rear and "run out" into the cone of the bore 60 at the rear ends of the root lines 64. The forward faces of the teeth 63 substantially correspond to the cross-sectional view in the plane 15—15. This specific position of the teeth 63 and the form and profile thereof preserves in the coupling element C' substantially and essentially the same structure, function, mode of operation and results of the other forms of serrated cutting edges hereinabove described and illustrated; the "flat" top tooth form here diminishing, as may be desired, the or any super-plowing effect as shown and obtained in the manner and under the circumstances discussed with especial reference to part 3 of FIGURE 9. In this embodiment of my invention it can be observed that it is practicable to employ most any tooth profile including those illustrated and discussed above and inhibit or eliminate what I have called super-plowing, without losing substantial advantage of this invention, by reducing the number of teeth per unit length of 61 and/or reducing the depth of the teeth in relation to the whole radial depth of the shoulder 62 short of the point where my improved tube penetrating and low torque characteristics are deleteriously impaired.

In this form and embodiment of my invention I prefer to incorporate the function and advantage referred to in reference to FIGURE 12 in respect to limiting the depth of the serrations. Here while the teeth 63 lie approximately at right angles to the direction of the teeth in FIGURE 12 and in the other figures of the drawings previously discussed, the depth of the teeth 63 is conveniently and preferably restricted to about a third or a half of the radial depth of the shoulder 62 so that the full continuous face of the shoulder 62 engages and makes a fluid tight seal against the rearward face of the ridge R when the final coupling engagement is established between the parts as shown in FIGURE 14. Also the rearward smooth continuous conical surface of the bore 60 will have gained smooth continuous fluid tight engagement with the groove G in the tube T at the completion of the working of the parts to final engagement. Meanwhile, the serrations in the cutting edge will have given the added facility of easy penetration into the wall of the tube and the other advantages characteristic of my invention especially useful in the beginning of the coupling operation as hereinabove described, and as in the other forms of my invention the advantages of the non-rotatable substantial integration between the element C' and the tube T will, among other things, have been obtained and preserved.

In FIGS. 17 and 18 the coupling element E" differs from the elements E and E', FIGS. 3 and 11 in having a working annular cutting edge 70 at the forward end of the element and closely adjacent the serrated cutting means 13' which may be raked rearwardly if desired as in FIG. 11 and may take any of the desirable tooth forms and profiles exemplary of my invention. Here, however, the radial depth of the serrations or serrated edge 13' is intended to be less than in the elements E and E', more nearly as in the elements C, FIG. 12, and C', FIG. 13, and is intended to share the work of cutting and gripping the tube into the anular edge 70. In this form the serrated cutting edge 13' is axially close to the annular cutting edge 70, and the thickness or stiffness of the forward end of the element adjacent its rounded nose 16" is preferably such, so that both cutting edges tend to be turned and constricted inwardly at about the same time when the nose 16" is forcibly worked within the mouth M.

In FIGURE 18 the parts are shown in their coupled condition; the coupling element E" having been worked between the nut N and body B into "double edged" biting, cutting and substantially integrated relation to the tube T, and the ridge R" having been turned up from the surface of tube by the action of and in front of the edge 70 whilst a second ridge R–2 with a zig-zag rearwardly facing parapet wall similar to the ridge 32, FIGS. 2 and 4, is turned up in front of the serrated edge 13'. In this presently preferred form of my invention the serrated edge first engaged the tube T as with tooth points like the points 26 of FIG. 7 for example, and begins the low-torque wall penetration with the operation and advantages thereof described above. Then as the ridge R–2 tends to fill the teeth of the edge 13' and fill the counterbore 71 behind the edge 70, the edge 70 gets into biting contact with the wall of the tube ahead of the ridge R–2 and takes its own annular cut and biting and fluid sealing engagement with the tube, turning up the ridge R″ and participating also in the bottoming of the coupling operation with its desirably increased wrench torque signaling the properly completed joint and seal. Here as in the other forms of my invention the serrated edge gains substantially immovable engagement with the tube to persist through endless uncouplings and recouplings, which in this form also preserves the mechanical and fluid seal between the edge 70 and the tube.

In FIGURES 19 and 20 I suggest convenient means for making my serrated cutting edge such as in the form of FIGURE 11, for example. In FIGURE 19 the element E–2 is supported in a fixture 75 in a punch press wherein a coaxially moving die 76, having the male form of the female serrations and tooth profiles of the serrated cutting means 13, is forcibly pressed against the forward (upper as viewed) end of the element whereby to coin and/or form the teeth directly into the end face of the element. Where rearwardly raked teeth are sought to be made, as suggested in this figure, the end face of the element will preferably have first been machined to appropriate conical form before receiving the impact and impression of the correspondingly conically formed die. Such working of the end of the element tends to displace metal radially inwardly of the smooth cylindrical bore adjacent the newly formed teeth. Therefore, for a second operation, I prefer to ream out the radially inward ends of the teeth of the serrated means 13 with a proper reamer or boring tool 77 to re-establish the true cylindrical form of the bore adjacent the teeth. Such is my preference with respect to elements of relatively small size having regard to the cost of making a die with as many teeth as are sought to be formed in the end of the coupling element.

For making the serrated edge of my invention in a larger coupling element E–3 a die 78 not dissimilar to the die 76 in respect to the male tooth forms is rotatably mounted on an arbor 79 with its axis 80 eccentric to the axis 81 of the element and rotatable relative to the axis of the element while the die is forcibly pressed into tooth coining or forming engagement with the forward end of the element. The bore of the element E–3 may and/or should also be reamed out smooth as in the case of the element E–2, FIGURE 21.

I do not disclaim other means of forming teeth or serrated and relatively spaced cutting points and edges, but I have found ways of making the cutting means practicable and satisfactory for carrying out objects of my invention. I have also found it practicable to employ this method of making the teeth in brass, steel and stainless steel coupling elements, for example, and have found the work hardening of making the teeth by this method sufficient to make the cutting points and edges of the teeth sufficiently harder than the tubes or pipes of the same material, respectively, to give the desired and characteristic mode of operation of my invention with the cutting, penetrating and digging of the tube by the means 13 above described. I have also found it practicable and advantageous to provide approximately twenty-five (25) teeth per inch of circumferential length of the cutting means 13 as when the pitch of a whole tooth is about .040″ as suggested above. It is not without my teaching and experience to provide more or less teeth in the cutting means and I also contemplate that the advantages of my invention will persist when only part of the cutting edge is serrated, as in uniformly angularly spaced portions thereof, or when one or more sharp edged or sharp pointed teeth are uniformly spaced from each other around the cutting edge by non-serrated portions.

In the foregoing description of preferred and illustrative forms of my invention, I have suggested specific tooth profiles, pitches, depths, rakes and spacings of teeth, and numbers and arrangements of cutting edges, all by way of illustration and without intending to limit the scope of my teaching and/or my patent. In the practice of my invention the advantages, functions and modes of operation which my present experience and teaching has attributed to these several factors in respect to materials used and service to be encountered will guide those who come to practice my invention and facilitate their full enjoyment and advantage thereof. Changes and improvements in and upon the forms and examples of my invention herein specifically disclosed may or will occur to those skilled in the art who understand and practice my invention, and I do not care to be limited in the scope of my patent to exclude such changes or improvements or in any manner incommensurate with the progress in the art promoted by my invention.

I claim:

1. In a tube coupling including a metal tube, a body member having a bore adapted to be coupled in alignment with the end of the tube, a coupling member surrounding the tube and adapted to be drawn up toward the body, and a metal sleeve between and in engagement with the body and the coupling member and having a circumferentially continuous annular portion having an inner periphery surrounding the tube, said coupling including means acting to force said annular portion radially into the tube and simultaneously move the same forwardly toward the body member when the coupling member is drawn up toward the body member, the coupling having abutment means limiting forward movement of the tube during such movement of said annular portion; the improvement comprising tube cutting edges including forwardly facing teeth around said annular portion, said teeth having spaced crest portions and flank portions diverging rearwardly from each crest portion, each joined to the adjacent flank portion by a root portion, said crest portions, flank portions, and root portions intersecting the inner periphery of said annular portion in sharp cutting edges continuously joined together about the entire inner periphery of said annular portion, whereby said tube cutting edges cut into the surface of said tube and shear up an uninterrupted ridge of metal projecting radially around the entire periphery of said tube, said ridge of metal having serrations filling the spaces between said teeth and forming a fluid seal and holding said tube against axial separation from the body member.

2. In a tube coupling including a metal tube, a body member having a bore adapted to be coupled in alignment with the end of the tube, a coupling member surrounding the tube and adapted to be drawn up toward the body, and a metal sleeve between and in engagement with the body and the coupling member and having a circumferentially continuous annular portion having an inner periphery surrounding the tube, said coupling including means to force said annular portion radially into the tube and simultaneously move the same forwardly toward the body member when the coupling member is drawn up toward the body member, the coupling having abutment means limiting forward movement of the tube during such movement of said annular portion; the improvement comprising tube cutting edges including forwardly facing teeth around said annular portion, said teeth having spaced crest portions and flank portions diverging rearwardly from each crest portion, each joined to the adjacent flank portion by a root portion, said crest portions, flank portions, and root portions intersecting the inner periphery of said annular portion in sharp cutting edges continuously joined together about the entire inner periphery of said annular portion, said annular portion also having a solid ring integral with and radially outside said teeth, said ring having a forwardly facing surface aligned with said crest portions and having sharp inner edges extending between said crest portions forming additional tube cutting edges, whereby said tube cutting edges cut into the surface of said tube and shear up an uninterrupted ridge of metal projecting radially around the entire periphery of said tube, said ridge of metal having serrations filling the spaces between said teeth and forming a fluid seal and holding said tube against axial separation from the body member.

3. In a tube coupling including a body member having a flared mouth adapted to receive the end of a tube, a coupling member adapted to be drawn up toward the body, and a sleeve between said members and having a circumferentially continuous forward end portion which is deformable radially inwardly, said forward end portion having an outer camming surface adapted to enter said flared mouth and to be forced radially inwardly and simultaneously moved forwardly toward the body member when said coupling member is drawn up toward the body member, said sleeve having a smooth inner peripheral surface, the coupling having abutment means limiting forward movement of the tube; the improvement comprising a serrated surface adjoining and lying radially outside said inner peripheral surface, said serrated surface comprising teeth having spaced crest portions connected by diverging flank portions which, in turn, are connected by root portions, the juncture of the faces of all of said teeth portions and said inner peripheral surface forming a sharp cutting edge, said deformable end portion and said cutting edge when deformed being adapted to form a seal between said body and the tube to be coupled and to hold said tube against axial separation.

4. The improvement defined in claim 3 in which said forward end portion includes a solid ring integral with and radialy outside said teeth, said ring having a smooth forwardly facing end surface and a smooth outer peripheral surface adapted to engage said flared mouth.

5. In a tube coupling including a body member having a flared mouth adapted to receive the end of a tube and a coupling member adapted to be drawn up toward the body member, a circumferentially continuous annular coupling ring between said members having a forward end portion which is deformable radially inward, said forward end portion having a smooth outer peripheral surface and terminating in an annular end face having a camming surface extending forward and inward from said outer peripheral surface and adapted to engage and be deformed inwardly by the flared mouth of the body member, said coupling ring having a smooth inner peripheral surface closely adjacent said forward end portion, an annular serrated surface interspacing and lying radially between said forward end portion and said inner peripheral surface, said serrated surface comprising forwardly facing teeth having spaced crest portions connected by diverging flank portions which, in turn, are connected by root portions, the juncture of the faces of all said teeth portions and said inner peripheral surface forming a sharp cutting edge spaced axially rearward from said end face, said forward end portion and said cutting edge when deformed being adapted to form a seal between said body member and the tube to be coupled.

References Cited in the file of this patent

UNITED STATES PATENTS

| | | |
|---|---|---|
| 1,931,666 | Lindquist | Oct. 24, 1933 |
| 2,158,757 | Kuestermeier | May 16, 1939 |
| 2,171,217 | Kreidel | Aug. 29, 1939 |
| 2,211,856 | Kreidel | Aug. 20, 1940 |
| 2,478,149 | Wolfram | Aug. 2, 1949 |
| 2,693,374 | Wurzburger | Nov. 2, 1954 |

FOREIGN PATENTS

| | | |
|---|---|---|
| 617,048 | Great Britain | Jan. 31, 1949 |